United States Patent

[11] 3,576,944

| [72] | Inventor | Kenneth B. LaBaw<br>China Lake, Calif. |
|---|---|---|
| [21] | Appl. No. | 794,512 |
| [22] | Filed | Jan. 28, 1969 |
| [45] | Patented | May 4, 1971 |
| [73] | Assignee | The United States of America as represented by the Secretary of the Navy |

[54] SCANNING RADIOMETER WITH PLURAL REFERENCE SOURCES
10 Claims, 3 Drawing Figs.

[52] U.S. Cl. ................................................ 178/6.8,
178/7.6, 250/83.3, 250/220, 356/46, 356/51
[51] Int. Cl. ..................................................... G01j 5/52,
H04n 3/08, H04n 7/18
[50] Field of Search .......................................... 178/61 (R),
6.8, 7.6, 7.1; 250/83.3(IR), 220(ORIG); 356/46, 51

[56] References Cited
UNITED STATES PATENTS
2,855,521  10/1958  Blackstone .................. 250/83.3IR

| 2,953,529 | 9/1960 | Schultz | 250/83.3IR |
|---|---|---|---|
| 3,078,341 | 2/1963 | Willey | 178/7.6X |
| 3,087,986 | 4/1963 | DeBrosse | 178/6.8 |
| 3,188,473 | 6/1965 | Bates | 250/83.3IR |
| 3,316,764 | 5/1967 | Nelson | 356/46 |
| 3,415,994 | 12/1968 | Fitti | 250/83.3IR |

*Primary Examiner*—Bernard Konick
*Assistant Examiner*—Howard W. Britton
*Attorneys*—Edgar J. Brower and Roy Miller

ABSTRACT: A scanning radiometer for producing long wave length infrared photographs and radiometric measurements. The instrument provides a raster type area scan by varying the horizontal and vertical field-of-view of the instrument. A detector produces a video signal which can be displayed on an oscilloscope and recorded with a camera to produce an area scanned picture.

INVENTOR.
KENNETH B. LABAW
BY
ROY MILLER
ATTORNEY.

SCANNING RADIOMETER WITH PLURAL REFERENCE SOURCES

GOVERNMENT INTEREST

The invention described herein may be manufactured and used by or for the Government of the United States of America for governmental purposes without the payment of any royalties thereon or therefor.

BACKGROUND OF THE INVENTION

It is often desirable to obtain a "heat picture" of an object. Such "heat pictures" may be brightest where the temperature of the field of view is high and darkest where the temperature of the field of the view is low. Such pictures may be obtained by using film sensitive to the infrared radiation emitted by any warm object. However, infrared film is not sufficiently sensitive to provide desirable pictures when the temperatures of the objects of interest are relatively low, or when small differences in temperature between the ambient and a particular object are to be measured.

Extremely sensitive infrared detectors have been developed which, when combined with appropriate optical elements, "view" only a small portion of the field to be covered. These are made to scan either optically or mechanically over the entire field of view, and the output signal therefrom is used to modulate a light beam which scans a photographic plate in timed relationship with the infrared detector. The picture recorded on the photographic plate or film thus depicts a thermal image of the field of view.

Prior arc scanning radiometers required up to 1 hour of substantially uniform temperature because of the necessity to periodically interrupt or chop the incoming signal to minimize detector drift. If the scanning rate were increased the high frequency components of the input signals were proportionately increased requiring an increase in the chopping frequency. HOwever, as the chopping frequency is increased, the time constant of prior art infrared detectors could not respond to the fast on-off sequence of the chopper. This resulted in low sensitivity to incoming signals and a low signal-to-noise ratio.

SUMMARY OF THE INVENTION

The development of infrared detectors with good sensitivity in the long wave length region and having very fast response time has made it possible to fabricate instrumentation having a small, instantaneous field of view that is able to rapidly scan a large area and still detect small radiation differences.

In accordance with the present invention, raster area scanning is accomplished by independently varying the horizontal and vertical view angle of the instrument. The horizontal sweep is generated by a 45° rotating mirror which receives radiation from 170° of view and sequentially from four collimated black body sources. The complete optical train, including the reference sources and collimators is tilted to produce the vertical scan, thus maintaining calibration for each horizontal sweep.

A mercury doped germanium detector produces a video signal which can be displayed on an oscilloscope and recorded with a camera in three basic modes; area scan picture, single trace of video displaced by vertical beam deflection, and single line sweep intensity modulated and displaced in the vertical direction as a function of time.

DESCRIPTION OF THE PREFERRED EMBODIMENTS

Figure 1:
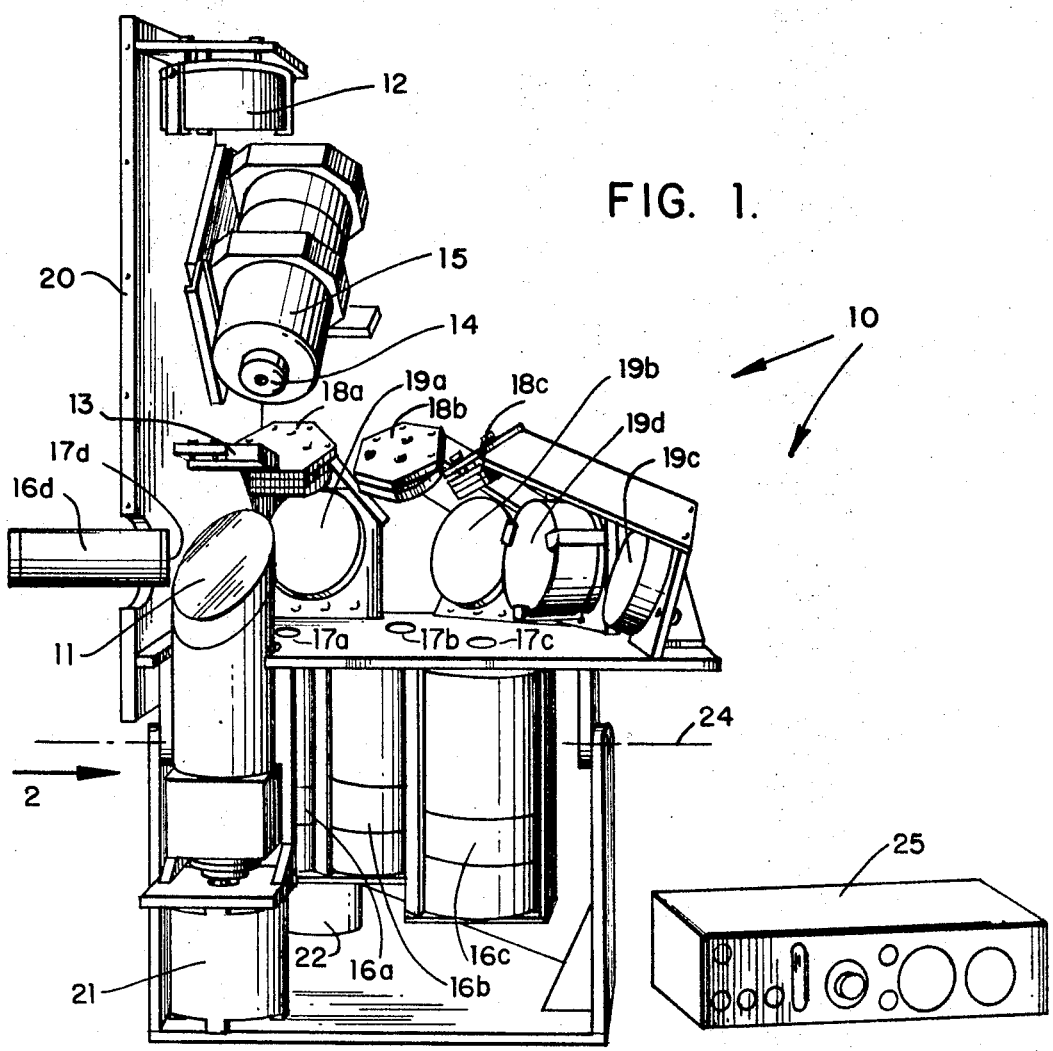
FIG. 1 is a schematic diagram of a preferred embodiment of the invention.

Referring to FIG. 1, raster area scanning is accomplished by independently varying the horizontal and vertical view angle of the instrument. The horizontal sweep is generated by a 45° rotating mirror 11. Rotating mirror 11 receives radiation from 170° of view and sequentially from four collimated black body reference sources 16a, 16b, 16d and 16c. The complete optical train or scanning assembly, 20, including black body reference sources 16a, 16b, 16c, and 16d and collimators 19a, 19b, 19c, and 19d is tilted along axis 24 to produce the vertical scan, thus maintaining calibration for each horizontal sweep.

The uppermost mirror located above, and on the axis of rotation of, scan mirror 11 is collector 12. The collected radiation passes from rotating mirror 11 to collector 12 to a deflecting mirror 13 and to a plane of focus in the area where the detector is mounted. A microscope may be placed at the plane of focus for the collected radiation to allow visual focusing and viewing through the reflective radiometer optics. Detector 15, which is mounted on frame 20, may comprise a helium-cooled germanium-copper detector for wavelengths to 30 microns, a hydrogen-cooled germanium-mercury detector for wavelengths to 14 microns, or a silicon photodiode detector for the very near infrared region of about 1.5 microns.

Three of the reference black bodies 16a, 16b and 16c are blackened cones fitted to Dewar flasks that can be filled with liquids at desired temperatures. The fourth reference source, 16d, is a heated cone that is controllable between 60° C. and 200°C. A minimum of two temperatures is required for calibration. Optimum precision is obtained when the reference temperatures cover the same range as the temperature of the objects to be measured.

For detector 15, the field stop is a knife-edged hole 14, in a baffled cold shield that surrounds the detector. The cold shield is maintained at nearly the coolant temperature of the detector. Spectral filters are used as windows for the detector and additional filters may be placed inside the cold shield. To prevent the detector from being exposed to any radiation except that from the collecting optics, an effective system aperture is formed by the detector area and distance behind field stop 14. Field stop 14 can be prepared to establish any desired instantaneous field of view up to 3 milliradians, and is located approximately 1 inch in front of an approximately 5 millimeter diameter detector 15 which gives the system a "speed" of f:5.1. The focal length of off-axis parabolic collector 12 is approximately 11 inches; thus a 0.11 inch diameter field stop will form a 1 milliradian field of view. With this detector-aperture configuration, the advantages of not requiring a field lens are realized. A field lens would be an additional absorbing element in the optical path and would be out-of-focus when the system is focused on near objects. The diameters of rotating mirror 11 and collector 12 are made large enough to eliminate vignetting for up to a 0.030 inch field stop and a 10 foot minimum range for system focus.

Figure 2:
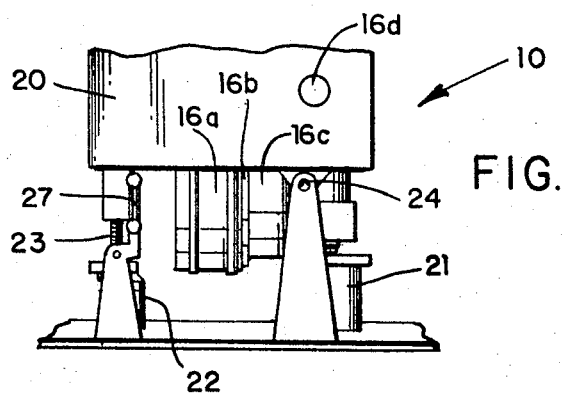
FIG. 2 is a side view of the same means for tilting the complete optical train of the invention.

Referring to FIG. 2, a frame 20 upon which detector 15 and black body reference sources 16a, 16b, 16c and 16d are mounted is tilted about vertical axis 24 by rotating jackscrew 23 driven by motor 22. A limit switch 27 triggers when the jackscrew reaches the maximum vertical angle of tilt in either direction from the horizontal plane.

The signal received by detector 15 is comprised of the radiation collected by rotating mirror 11 successively from the area scan and four black body reference sources 16a, 16b, 16d and 16c. The radiation from black body reference sources 16a, 16b and 16c passes through openings 17a, 17b and 17c, respectively, to mirrors 18a, 18b and 18c, respectively, then to collimators 19a, 19b and 19c, after which the radiation passes to rotating mirror 11. Radiation from black body reference source 16d passes through opening 17d to collimator 19d, and then to rotating mirror 11. Mirror 11 is rotated by motor 21 so that the radiation received by detector 15 alternately comes from the area scan, then black body reference sources 16a, 16b, 16d and 16c.

Figure 3:
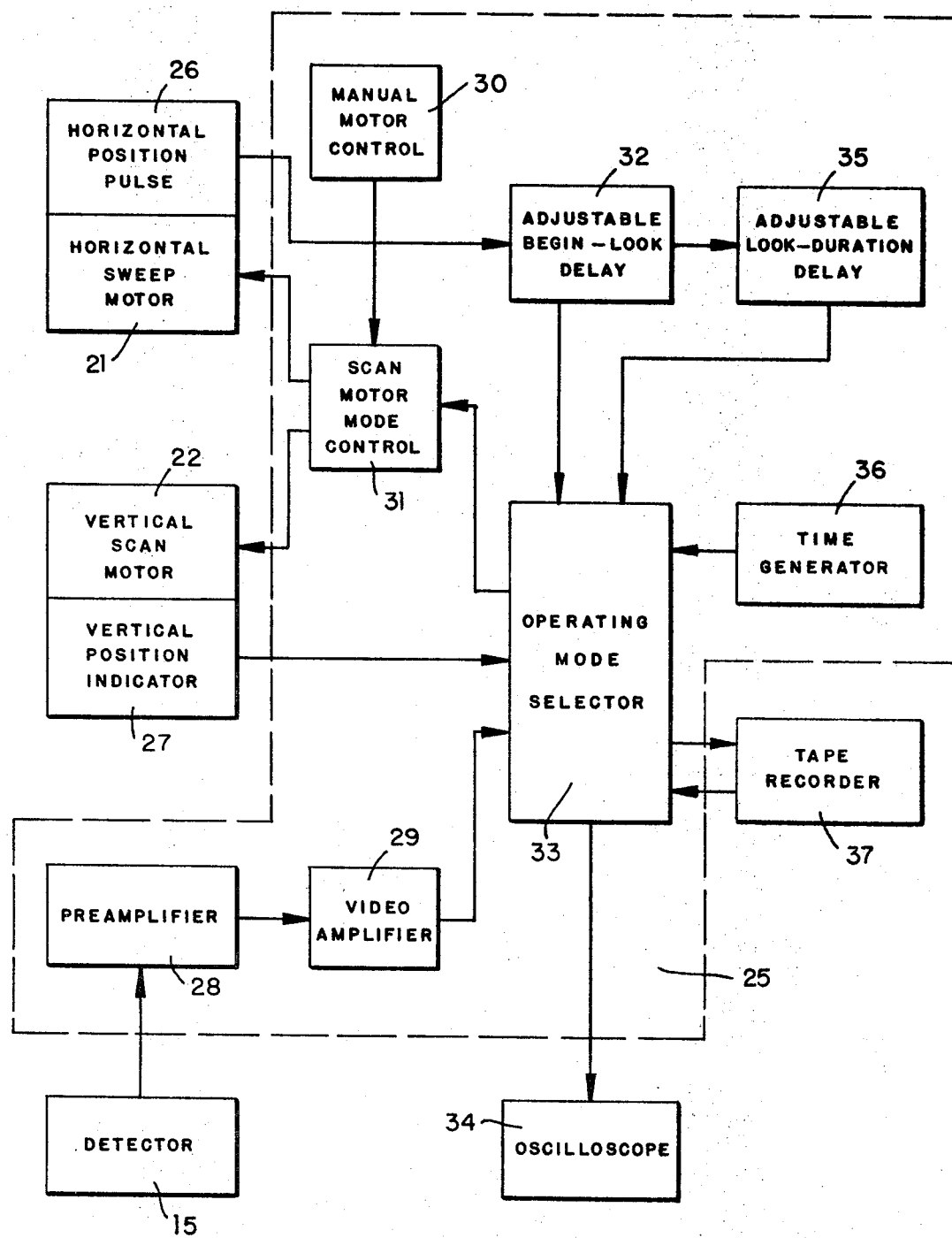
FIG. 3 is a block diagram of the control electronics of the preferred embodiment of the invention shown in FIG. 1.

The control electronics, 25, of the radiometer will be described with reference to FIG. 3. Rotating mirror 11 is driven by horizontal sweep motor 21 at approximately 600 r.p.m. or 10 sweeps per second. An instantaneous field of view of 1 milliradian gives an optical resolution of $2\pi \times 10^3$ parts in one revolution. The detector frequency output from grid lines at this resolution (square wave 1 milliradian on, 1 milliradian off) is $10\pi \times 10^3$ c.p.s. Thus, the electronic frequency response of the system must be flat from 0.1 Hz. through 32 kHz. to pass all information. Higher frequency information may be present but distorted in magnitude due to the size of the instantaneous field of view. Since measurements of many sources will be limited by system noise, a wider band width is not used. The corresponding detector response time must then be less than $$\tau = \frac{1}{2\pi f} = 5 \text{ microseconds}$$

The signal from detector 15 is amplified by preamplifier 28 and video amplifier 29 and fed to operating mode selector 33. The video signal can be displayed on a cathode ray oscilloscope 34 and recorded with a camera in three basic modes: (1) area-scan picture, (2) single trace of video displayed by vertical-beam deflection, and (3) single-line sweep intensity modulated and displaced in the vertical direction as a function of time. The video signal is electronically gated so that any portion or all of the 360° of horizontal sweep can be shown on the cathode ray tube.

Independent adjustments set the initial point and the extent of the horizontal view. All controls, except vertical-scan extent, are contained in a separate control unit 25.

Vertical control is obtained as follows. The video signal from detector 15 is amplified by preamplifier 28 and video amplifier 29, gated, and directed to the vertical deflection or intensity-modulation circuitry of oscilloscope 34 depending on the operating mode selected. Vertical scan motor 22 and the cathode ray tube unblanking are initiated by a momentary switch. The extent of the vertical field of view is adjustable by limit switch stops 27 located near jackscrew 23 driven by scan motor 22. When the vertical scan is completed, vertical scan motor 22 and the cathode ray tube beam intensity are automatically turned off. In the video signal and single line sweep versus time modes, the vertical position remains fixed whenever it is set by manual motor control 30 which controls scan motor mode control 31 which in turn controls vertical scan motor 22. The vertical scan may be set to travel to either extreme or to cycle up and down and it can be stopped in any position. For the single line sweep versus time mode, a vertical cathode-ray tube beam displacement is provided by a voltage ramp time generator 36. The ramp generator may be a linear rotary potentiometer driven by a synchronous motor, pulleys and a belt, or an electronic time generator. The ramp generator has an automatic shutoff as does the cathode-ray tube beam intensity control, and both are initiated by the same momentary switch for normal vertical scanning.

Horizontal control is obtained as follows. Horizontal sweep motor 21 remains on for all output modes. A magnetic pickup pulse is obtained from mirror 11 when it is in position to sweep across the horizontal field of view. This position pulse triggers a monostable multivibrator 32 with an adjustable time delay. When adjustable begin-look delay monostable multivibrator 32 returns to the stable state, it opens a video gate. The opening of the video gate triggers the horizontal sweep of oscilloscope 34 and then triggers a second monostable multivibrator 35 called the adjustable look-duration delay. The adjustable begin-look delay 32 monostable multivibrator also provides the initiation point of the horizontal scan field of view. This initiation can be set for any position in the 360° of sweep-mirror rotation.

Adjustable look-duration delay monostable multivibrator 35 has a time delay that is adjustable from about 6.5 to about 120 milliseconds. The second time adjustment determines the extent of the horizontal field of view by closing the video gate.

The video-gate opening is under AND logic control from horizontal-position multivibrators 32 and 35 and the vertical display mode automatic stop. The gating feature keeps the cathode-ray tube beam intensity off before and after generating a picture.

Video processing is obtained as follows. Contrast and brightness adjustments are provided for optimizing pictures under varying infrared scene conditions. Contrast is adjusted by varying electronic gain in the video signal. Brightness, or exposure level, is adjusted by varying the direct current bias on the cathode-ray tube beam intensity.

The ratio of radiance differences found in many outdoor scenes to the minimum detectable radiance difference can be as high as 1,000. For example, with an 8 to 14 micron central band, the effective radiance difference between a 50° C. black body reference and clear sky at a 15° elevation is 5.6 milliwatts/(cm.$^2$ . ster). The effective radiance difference for a 0.1° C. room temperature black body difference is 0.0073 milliwatts/(cm.$^2$ . ster).

The resulting ratio is 767. The dynamic range of photographic film used in conjunction with an oscilloscope is not sufficient to accurately display this range or radiometric signals. It therefore becomes necessary to choose the portion of the video signal that is of most interest with the forfeiture of portions outside the dynamic range of the recording film. When details of a normally dark area are of interest, the video is clipped to prevent fogging from extremely overexposed areas.

The video signal polarity can be selected so that exposure of the recording film corresponds to either greater or lesser radiation. Polarity inversion is similar to, but not the same as, a photographic negative. The difference is brought about by the limited dynamic range of the film.

Outputs for a tape recorder 37 are provided from ungated radiometric signals, horizontal reference pulses, and the vertical scan indicator. The tape-recorded data can be played back into the control electronics through operating mode selector 33 for normal display, or it can be supplied to galvanometer recorders for radiometric assessment.

I claim:
1. A scanning radiometer comprising:
    a plurality of reference source sources of black body radiation;
    a scanning mirror positioned to receive and reflect infrared radiation from a field of view comprising horizontal and vertical components;
    means for rotating said scanning mirror to receive infrared radiation sequentially from the horizontal component of the field of view and from the black body reference sources;
    means for tilting the scanning mirror in a timed relationship with the rotation of the scanning mirror to produce a scan of the vertical component of the field of view;
    an infrared sensitive detector for producing video signals proportional to the amount of infrared radiation reflected thereon by the scanning mirror;
    means for displaying the video signals produced by the detector on an oscilloscope; and
    camera means for recording the oscilloscope display; so that a "heat picture" of the raster area scanned is produced by the camera means.
2. The scanning radiometer as set forth in claim 1 wherein:
    said reference sources,
    said scanning mirror,
    said rotating means, and
    said detector retain their respective positions during said tilting.
3. The scanning radiometer as set forth in claim 1 wherein:
    the reference sources of black body radiation are four in number; and
    there are approximately 170° in the horizontal component of the field of view.
4. The scanning r ad radiometer as set forth in claim 3 wherein;

three of the black body reference sources of radiation are blackened cones fitted to Dewar flasks; and
the fourth is a heated cone having a temperature controllable from about 60° C. to about 200° C.

5. The scanning radiometer as set forth in claim 4 wherein:
the means for tilting the scanning mirror in a timed relationship with the rotation of the scanning mirror comprise;
a rotating jackscrew driven by a motor, and
a pair of limit switches which trip when the jackscrew tilts the scanning mirror to the maximum from the horizontal plane in either direction, so that
the direction of rotation of the jackscrew reverses whenever a limit switch is tripped.

6. The scanning radiometer as set forth in claim 5 wherein:
the oscilloscope is triggered to produce a beam when:
either limit switch is tripped, and
the scanning mirror rotates past a predetermined point in the horizontal component of the field of view;
the beam is caused to sweep across the oscilloscope screen in a timed relationship with the rotation of the scanning mirror by a ramp voltage generator; so that
the beam sweeps once across the screen as the scanning mirror rotates through the horizontal field of view;
the beam blanks and retraces when the scanning mirror rotates past a second predetermined point in the horizontal component of the field of view; so that
scanning continues until the desired raster area is scanned and the other limit switch is tripped.

7. The scanning radiometer as set forth in claim 6 wherein; the scanning mirror is rotated at approximately 600 r.p.m. or 10 sweeps per second.

8. The scanning radiometer as set forth in claim 7 wherein; the detector comprises a helium-cooled germanium copper detector.

9. The scanning radiometer as set forth in claim 7 wherein; the detector comprises a hydrogen-cooled germanium-mercury detector.

10. The scanning radiometer as set forth in claim 7 wherein; the detector comprises a silicon photo-diode detector.